G. A. LUTZ.
MEANS FOR INSULATING CANOPIES FOR SYSTEMS OF ELECTRICAL DISTRIBUTION.
APPLICATION FILED FEB. 20, 1909.
994,474.
Patented June 6, 1911.
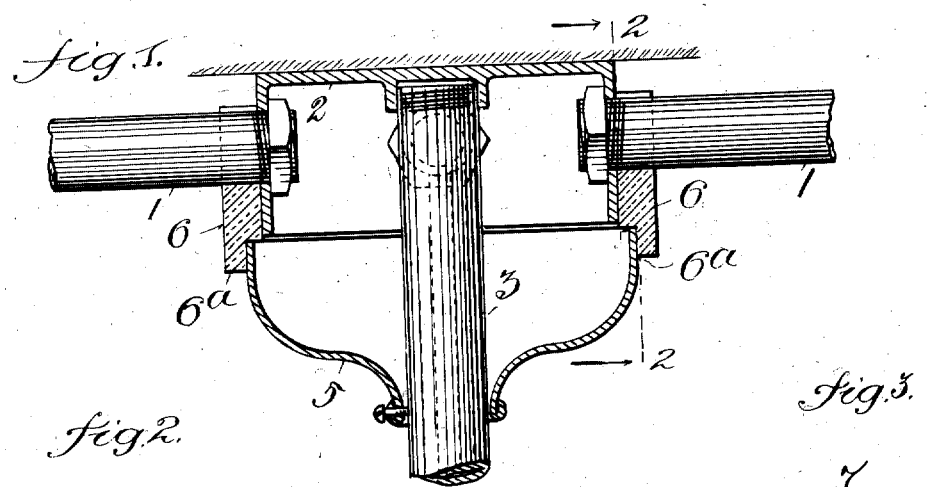
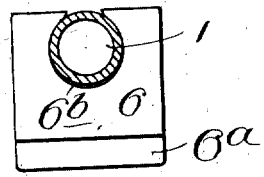
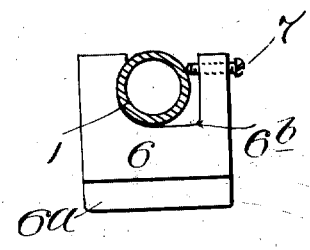
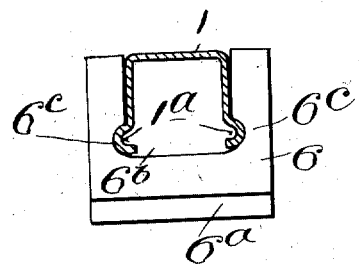
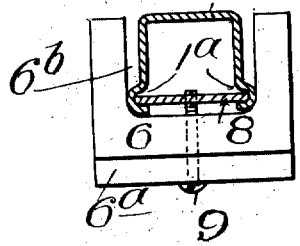
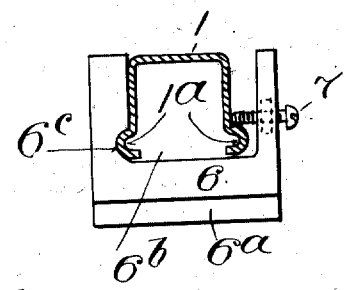
Witnesses:
Inventor
Geo. A. Lutz,
By his Attorney
D. F. Bourne

UNITED STATES PATENT OFFICE.

GEORGE A. LUTZ, OF PLAINFIELD, NEW JERSEY.

MEANS FOR INSULATING CANOPIES FOR SYSTEMS OF ELECTRICAL DISTRIBUTION.

994,474.  Specification of Letters Patent.  Patented June 6, 1911.

Application filed February 20, 1909. Serial No. 479,044.

*To all whom it may concern:*

Be it known that I, GEORGE A. LUTZ, a citizen of the United States, and resident of Plainfield, in the county of Union and State of New Jersey, have invented certain new and useful Improvements in Means for Insulating Canopies for Systems of Electrical Distribution, of which the following is a specification.

The object of my invention is to provide simple and efficient means for insulating canopies from conduits, outlet boxes and the like and whereby the insulating means will be adaptable to canopies of varying dimensions.

In carrying out my invention I provide blocks or pieces of insulating material adapted to be fitted and supported upon conduits for electric conductors, such as pipes, molding and the like, and against which blocks the canopies may bear to insulate them from the conduits and outlet boxes.

My invention also comprises the novel details of improvement that will be hereinafter more fully set forth and then pointed out in the claims.

Reference is to be had to the accompanying drawings forming part hereof, wherein, Figure 1 is a central sectional view of a portion of an electrical conduit system embodying my improvements. Fig. 2 is a sectional view on the line 2, 2, in Fig. 1; Fig. 3 is a similar view of a modification; Fig. 4 is a view similar to Fig. 2, showing the insulating block upon a metal conduit or molding having one side open. Fig. 5 is a similar view of a modification, and Fig. 6 is a similar view of another modification.

In the accompanying drawings the numeral 1 indicates a conduit for electric wires of any suitable construction, which may be in the form of a pipe, as in Figs. 1, 2 and 3, or in the form of a molding of well known character as shown in Figs. 4, 5 and 6.

At 2 is an outlet or junction box of any suitable construction to which conduits 1 may be connected or applied in any well known manner.

At 3 is a pendant pipe supported by and extending from box 2 in any well known manner through which the conductors pass from the conduits in well known manner, which pipe may be used for supporting fixtures or lamps as usual.

The canopy 5 of suitable or usual construction surrounds pipe 13 so as to protect and conceal the outlet box and the adjacent ends of the conduits in well known manner.

6 indicates blocks or pieces of insulating material as, for instance, porcelain, which blocks are applied to the conduits adjacent the outlet box, the canopy being fitted to or against said insulated blocks. Said blocks are shown provided with recesses $6^a$ receiving the adjacent edges of the canopy, said recesses being shown formed in one edge of the blocks, whereby the blocks extend below the upper edge of the canopy. Blocks 6 are provided with transverse openings $6^b$ which receive the conduits. In Figs. 1 and 2 the openings $6^b$ in blocks 6 are so formed as to inclose or encircle the conduits whereby the blocks are supported by and hang upon the conduits, in which case the block will be slipped upon the corresponding conduit from one end of the latter before the final fitting in place of the conduit.

In Fig. 3 a screw 7 is fitted to block 6, whereby the opening $6^b$ of the block may be slipped sidewise over the conduit, and the screws 7 set up against the conduit to hold the block in place.

In Fig. 4 the opening $6^b$ is provided with offset recesses $6^c$ to receive the projecting parts $1^a$ of the conduit or molding, the block being slipped along the conduit from its end before the conduit is fitted in place.

In Fig. 5 the block 6 is provided on one side with a recess $6^c$ to receive the extended part $1^a$ of the conduit and the screw 7 fitted to the opposite side of the block will engage the corresponding part $1^a$ of conduit 1 to retain the block thereon, whereby the block may be slipped edgewise upon the conduit after the latter is fitted in place.

In Fig. 6 the opening $6^b$ is wide enough to permit the block to be slipped edgewise upon the conduit 1 while the latter is in place, and a strip 8, preferably of metal, which engages the extended or grooved parts $1^a$ of conduit 1, receives a screw 9 passing through an opening in block 6, whereby the block is attached to the conduit.

By means of my improvements the canopy 5 may be thoroughly insulated from the outlet box and from the conduits by the blocks 6 which may be adjusted along the conduits transversely of the canopy, whereby canopies of different widths may be insulated from the conduits and said blocks remain suspended upon the conduits when the canopy is removed. By means of my improvements the usual insulating rings at the upper ends of such canopies may be dispensed with, whereby also the support of such insulating rings by the canopies is avoided.

Having now described my invention what I claim is:—

1. The combination of a conduit, an outlet box connected therewith, and a canopy below the box, with an insulating block mounted upon the conduit adjacent the box and coacting with the canopy.

2. The combination of an outlet box and conduits associated therewith, with a canopy adjacent said box, and insulating blocks supported by the conduits for co-action with the canopy.

3. The combination of an outlet box and conduits associated therewith, with a canopy adjacent said box and insulating blocks adjustably hung upon said conduits for co-action with said canopy.

4. In combination of an outlet box and conduits associated therewith, with a canopy adjacent said box and insulating blocks adjustably hung from said conduits for co-action with said canopy, said blocks being located adjacent the outer sides of said box.

5. The combination of opposed conduits and a canopy, with insulating blocks hung upon the conduits and spaced apart, said blocks receiving the canopy between them.

6. The combination of conduits for electric wires, insulating blocks spaced apart upon said conduits, means for sustaining said blocks upon the conduits, and a canopy located between and coacting with said blocks.

7. The combination of a horizontal conduit, with an insulating block having a horizontal opening receiving said conduit, means for sustaining said block to have lateral adjustment along the conduit, and a canopy co-acting with said block, said block having a recess in its lower edge receiving said canopy.

8. The combination of conduits for electric conductors spaced apart, a conduit interposed between and depending below the first named conduits, insulating blocks hung upon the first named conduits and spaced apart, and a canopy attached to the depending conduit and co-acting with the insulating blocks.

9. The combination of an outlet box, conduits attached to the sides of the same, a conduit depending from the interior of the box, insulating blocks associated with the first named conduits, and a canopy adjacent said box attached to the depending conduit and co-acting with said blocks.

Signed at New York city, in the county of New York, and State of New York, this 15th day of February, A. D. 1909.

GEORGE A. LUTZ.

Witnesses:
RALPH H. RAPHAEL,
T. F. BOURNE.